(12) United States Patent
Widanagamage Don et al.

(10) Patent No.: US 8,467,669 B2
(45) Date of Patent: Jun. 18, 2013

(54) CORDLESS KETTLE WITH DATA COMMUNICATION WITH CORDLESS BASE

(75) Inventors: Lochana Subasekara Widanagamage Don, Caringbah (AU); Eddie Siu, Chifley (AU)

(73) Assignee: Brevilie Pty Limited, Botany, New South Wales (AU)

( * ) Notice: Subject to any disclaimer, the term of this patent is extended or adjusted under 35 U.S.C. 154(b) by 535 days.

(21) Appl. No.: 12/601,806

(22) PCT Filed: May 26, 2008

(86) PCT No.: PCT/AU2008/000724
§ 371 (c)(1),
(2), (4) Date: Dec. 1, 2009

(87) PCT Pub. No.: WO2008/144805
PCT Pub. Date: Dec. 4, 2008

(65) Prior Publication Data
US 2010/0158489 A1  Jun. 24, 2010

(30) Foreign Application Priority Data

May 25, 2007  (AU) ............................... 2007902803
Sep. 3, 2007  (AU) ............................... 2007904740

(51) Int. Cl.
*A01K 63/06*  (2006.01)
(52) U.S. Cl.
USPC ............ 392/444; 392/441; 239/128; 119/229
(58) Field of Classification Search
USPC ... 392/441–464; 119/229–262; 219/429–437; 222/146.1–146.6; 239/128–139
See application file for complete search history.

(56) References Cited

U.S. PATENT DOCUMENTS

2009/0307404 A1* 12/2009 Payn ............................ 710/304

* cited by examiner

*Primary Examiner* — Thor Campbell
(74) *Attorney, Agent, or Firm* — Michael Molins

(57) ABSTRACT

The present technology enables data communication between a kettle body and a power base of a cordless kettle. This enables a user to view kettle data and control functions or parameters such as temperature, from the power base of a cordless kettle.

9 Claims, 18 Drawing Sheets

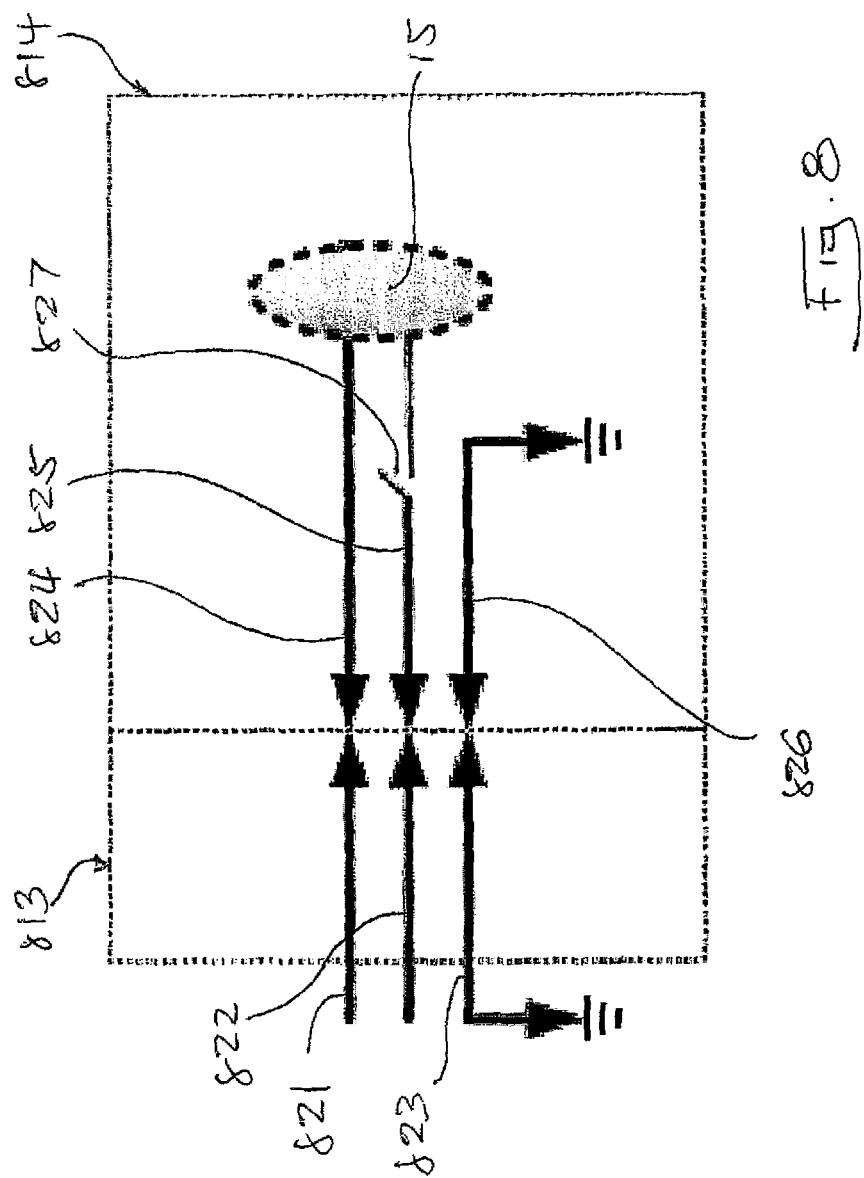

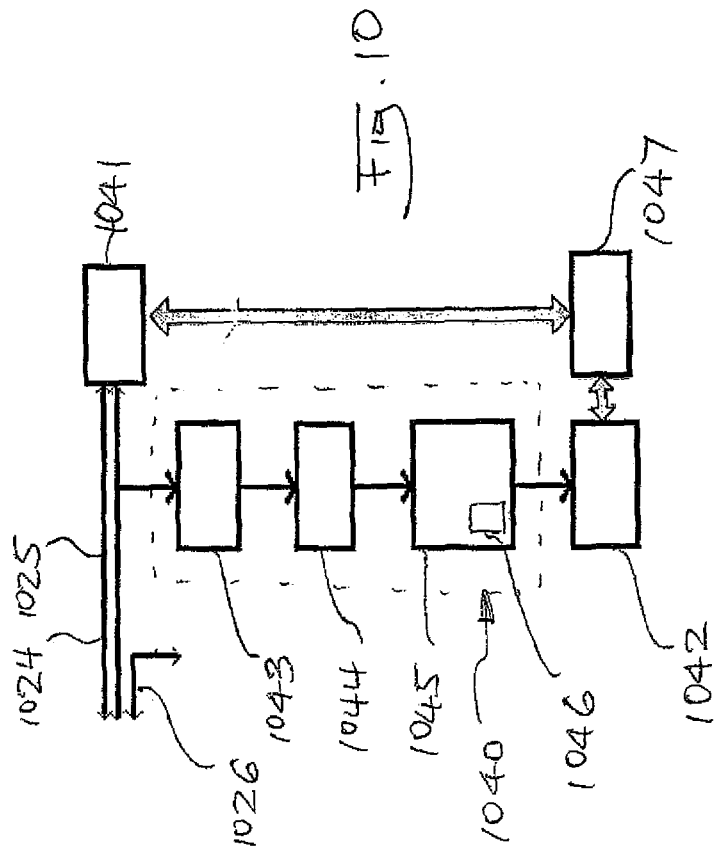
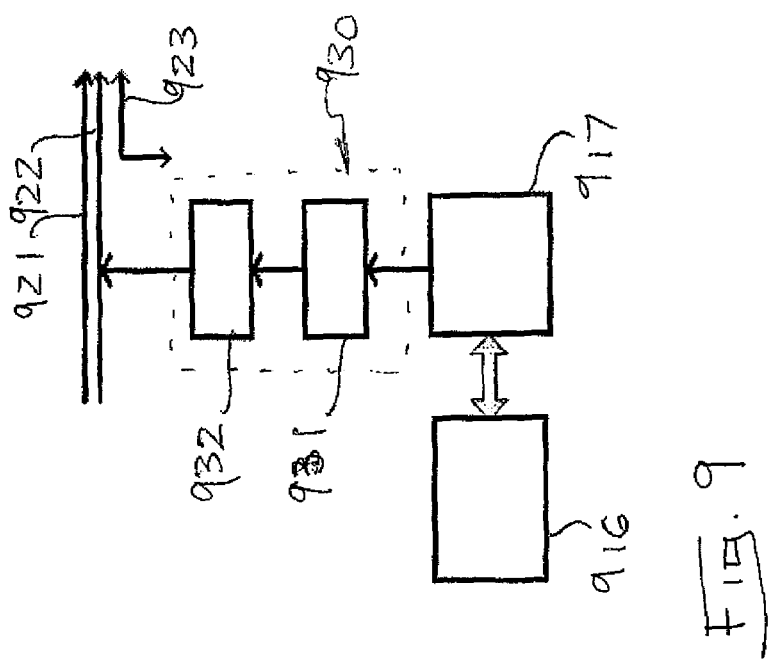

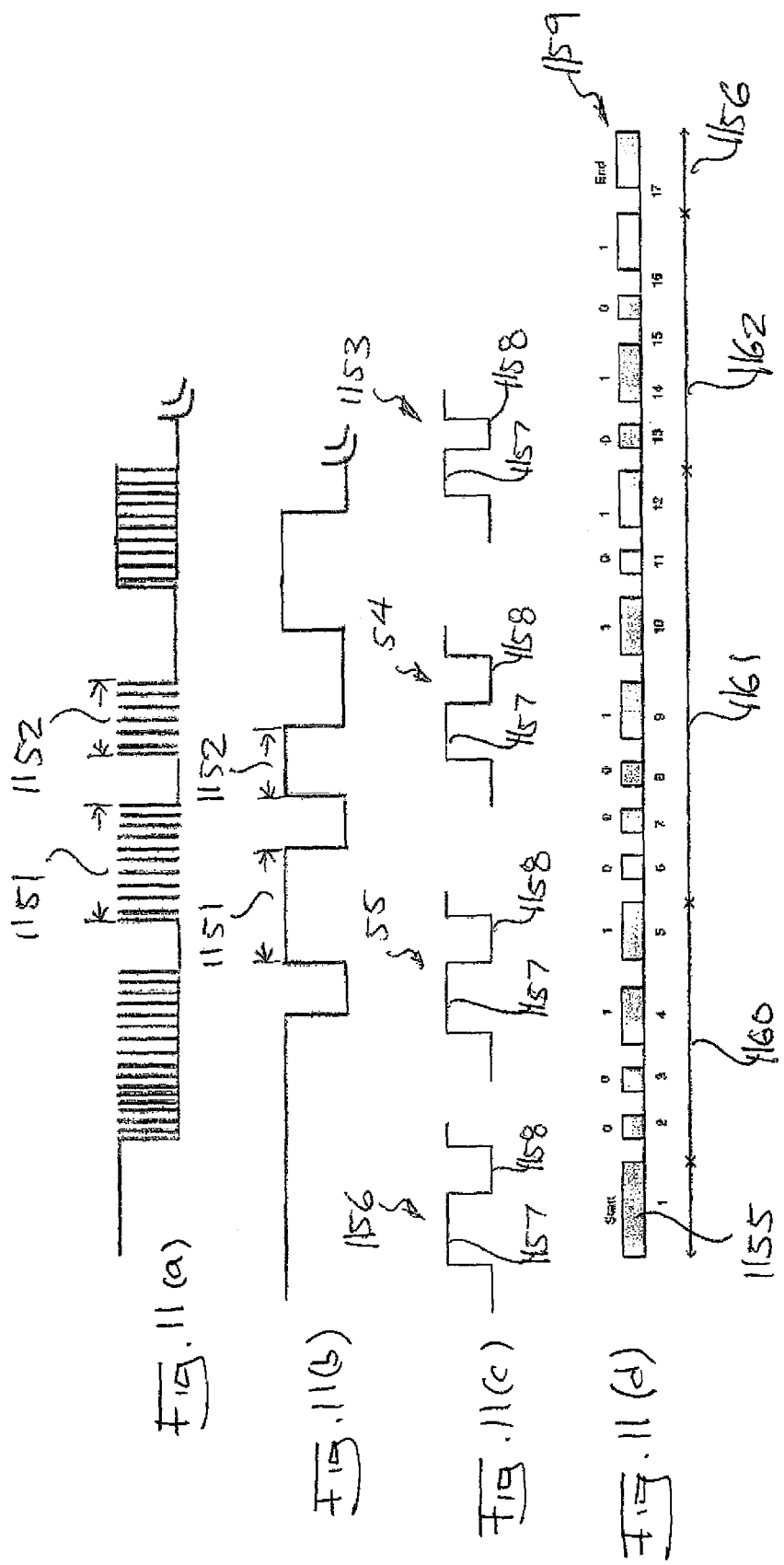

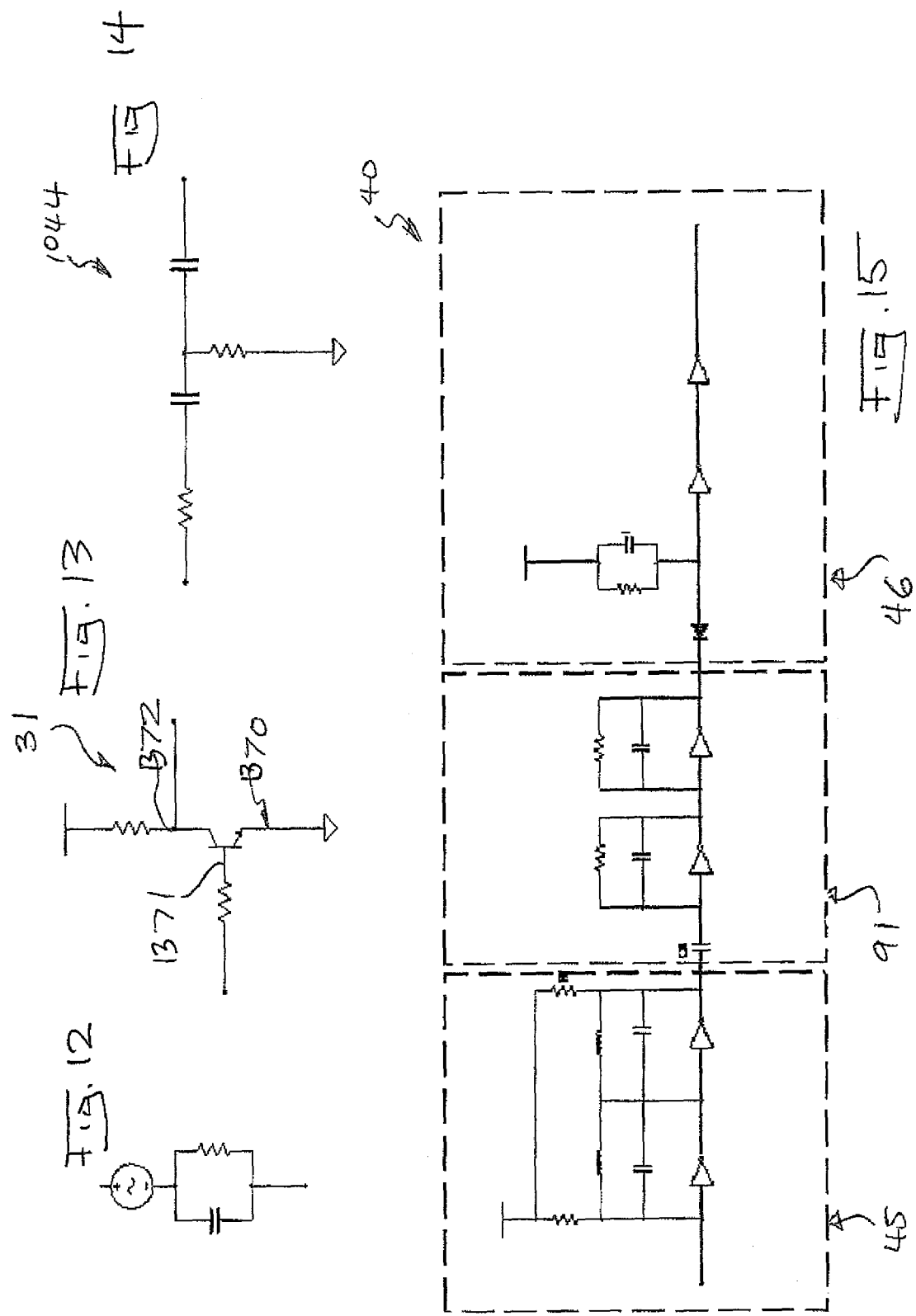

CORDLESS KETTLE WITH DATA COMMUNICATION WITH CORDLESS BASE

FIELD OF THE INVENTION

This technology relates to cordless kettles, in particular cordless kettles having data communication between the kettle and the base.

BACKGROUND OF THE INVENTION

Cordless kettles, which can be detached from and are powered by bases, are known. However, most available kettles of this type do not offer more sophisticated controls other than on/off switching. Some "controls" that may be desirable include temperature control, or a selection that relates to the type of beverage that the kettle makes. In a cordless kettle, power transmission between the vessel and the base may be enabled by a three pole connector. The three pole connector transmits power from the base to the heating element in the vessel.

User controls, other than power switching, are desirable in some situations. For example, it is useful to have user-adjustable temperature settings for tea-brewing. To conveniently achieve extra user controls for an available kettle having a 3 pole connection, the control algorithm and user interface keys need to be located on the vessel. Locating user interface keys on the vessel, however, causes some inconvenience for the user and limits the design flexibility for the kettle.

OBJECT AND SUMMARY OF THE INVENTION

Hence, it is an object of the present technology to enable data communication between the kettle body and the power base of a cordless kettle.

It is another object of the present technology to enable user control over functions or parameters such as temperature, from the power base, for a cordless kettle.

It is still another object of some embodiments of the present technology to provide a boiling point assessment mechanism in a cordless kettle.

It is further desirable to provide user controls in the power base, for kettles that are orientation insensitive.

BRIEF DESCRIPTION OF THE DRAWING FIGURES

In order that the invention be better understood, reference is now made to the following drawing figures in which:

FIG. 2(*b*) is an exploded perspective view showing the components involved in a power line communication through a five pole connector;

FIG. 5(*b*) is an exploded perspective view showing an example of the spatial relationships between the electromagnetic transmitters and the electromagnetic receivers;

FIG. 8 is a schematic diagram depicting the three pole connection between the base and the vessel;

FIG. 9 is a schematic diagram depicting a transmitter;

FIG. 10 is a schematic diagram depicting a receiver;

FIG. 11(*a*) is a schematic diagram depicting a high frequency carrier modulated data;

FIG. 11(*b*) is a schematic diagram depicting a demodulated data;

FIG. 11(*c*) is a schematic diagram depicting the logic "0" pulse, the logic "1" pulse, the start bit pulse, and the end bit pulse;

FIG. 11(*d*) is a schematic diagram depicting an example of transmitted data;

FIG. 12 is a circuit diagram for a decoupling device;

FIG. 13 is a circuit diagram for an amplifier;

FIG. 14 is a circuit diagram for a high pass filter;

FIG. 15 is a circuit diagram for a receiver;

BEST MODE AND OTHER EMBODIMENTS

Figure 1:
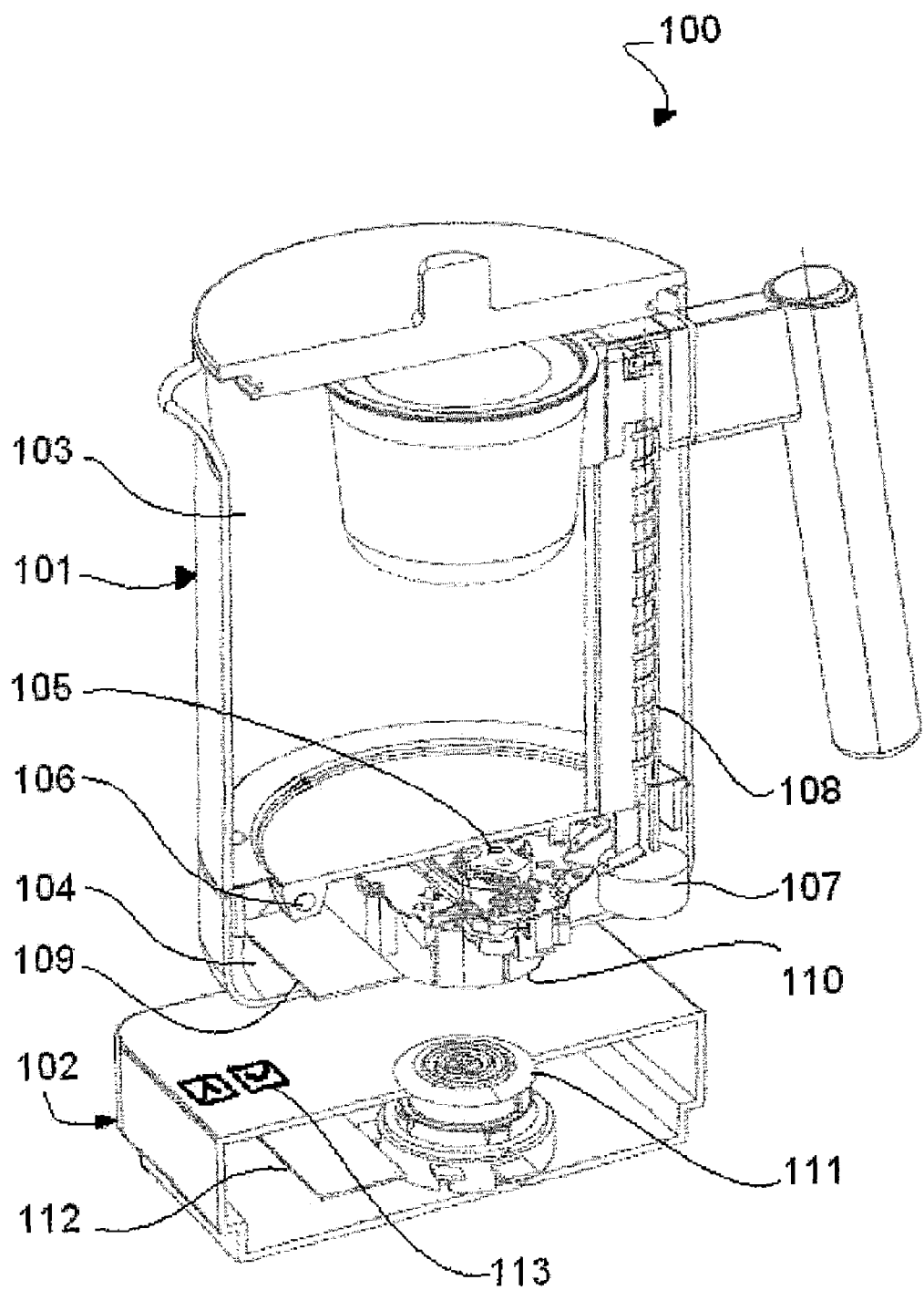
FIG. 1 is a cross section in perspective, of a cordless kettle in which data communication between the vessel and the base is possible.

As shown in FIG. 1, a cordless kettle or hot beverage maker 100 has a body (or "vessel") 101 that is adapted to sit atop a power base 102. Preferably the kettle is operable irrespective of the rotational orientation of the body relative to the power base. For the purpose of this specification, a kettle of this type is referred to as a "360° kettle" or "orientation insensitive", while a kettle that requires fixed orientations between the power base and the vessel is referred to as a "fixed orientation kettle".

The body is further divided into a liquid compartment 103 and a (dry) control compartment 104. The control compartment 104 houses components such as temperature sensors 105, processors or MCUs as required and heating elements 106. If the device is a tea maker or brewer, the liquid or control compartment 103, 104 may further have cooperating brew related mechanisms such as a motor 107 and a conveyor 108, for example, to enable the submergence of tea leaves. Within the control compartment 104, there is also a printed circuit board or other appropriate circuitry or processor etc. (all designated together as "PCB" for convenience) 109, powered through the upper connector 110 that enables software and/or logic or power control over the aforementioned components.

A recess or opening is formed into the bottom of the control compartment. The power base 102 is connected to the power outlet, and supports a protruding lower connector or coupling component 111 that is received in the recess. The lower connector 111 is connectable to the upper connector or coupling 110 and makes electrical contact with the upper connector 110 when the power base 102 and the vessel 101 are assembled. This vessel enables power to be delivered to the various components housed in the control compartment 104.

In an embodiments of the kind shown in FIG. 1, the power base 102 houses a second PCB 112 that may be electrically connected to the lower connector 111 and that is adapted to engage in data communication with the first PCB 109. The power base 102 further comprises exterior user controls 113, and other features such as an electronic display of variable and user selected beverage settings, temperature or brew time left.

Because the power base 102 may generally enclose fewer components, compared to the control compartment 104, the provision of the second PCB 112 within the power base 102 allows a greater degree of flexibility in the layout of user controls and digital displays.

A user can control the operation of the cordless kettle from the power base. The second PCB 112 encodes the control parameters into data signals that are transmitted to the vessel's PCB 109 via the connectors 110, 111. The vessel's PCB 109 then decodes these signals into commands that directly or indirectly operate the various components, such as the motor, thermistor, or the heating element, in the control compartment. It is preferred that the data communications between the PCBs are bidirectional, allowing for feedback communication from the upper PCB to the lower PCB. Embodiments having different methods of data communication are described below.

Figure 2:
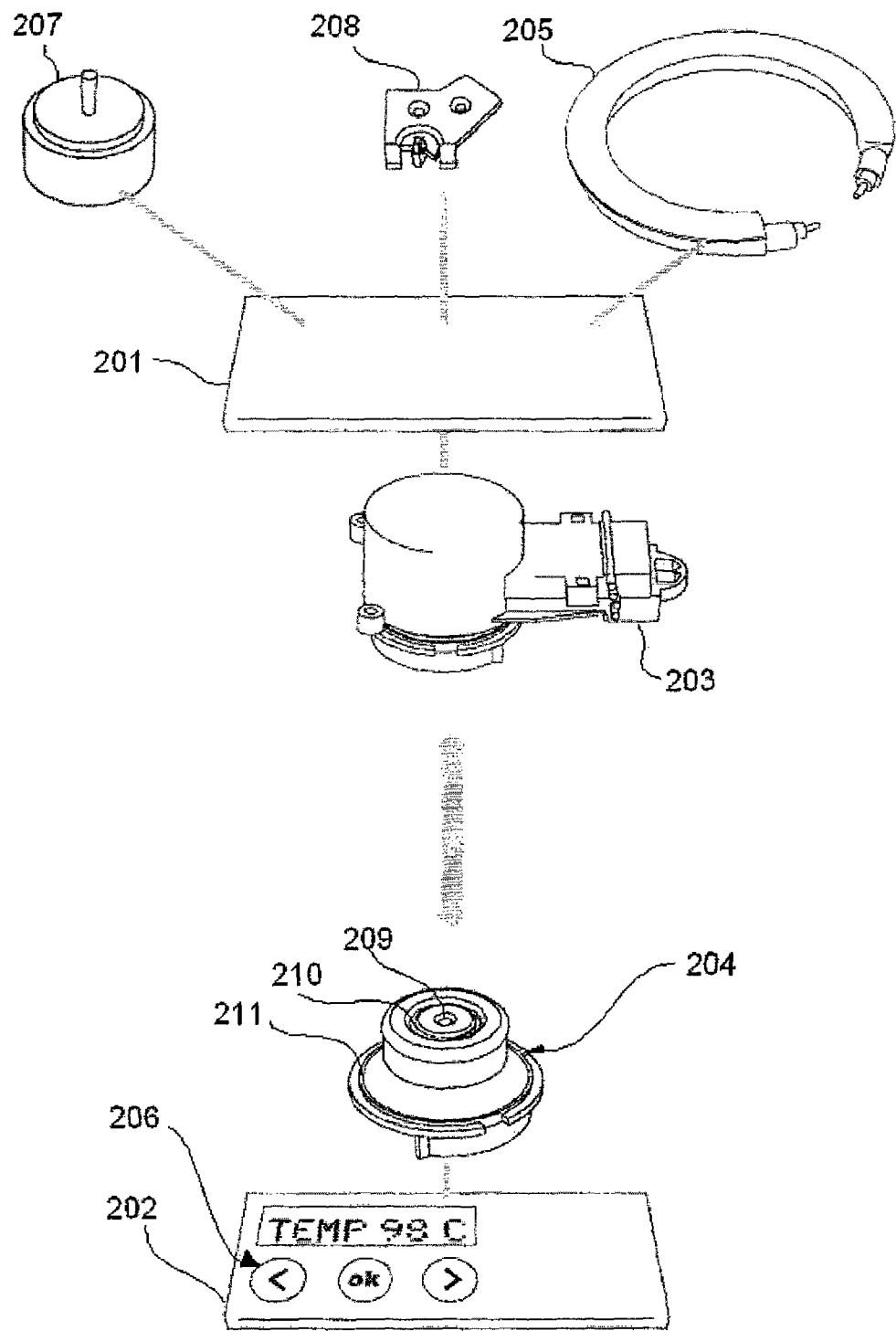
FIG. 2(*a*) is an exploded perspective view showing the components involved in a power line communication through a three pole connector.

In the embodiment shown in FIG. 2(a), the first and second PCBs 201, 202 engage in power line communication. The first and second PCBs 201, 202 are respectively connected to the upper connector 203 in the control compartment and the lower connector 204 in the power base. Thus data and power share the same physical connection.

For a 360° kettle, each of the upper and lower connectors may be e.g. conventional three or five contact (i.e. three or five "pole") connectors. For the connectors, catalogue items from manufacturers such as (but not limited to) Strix or Otter may be used.

In the example shown in FIG. 2(a), the upper and lower connectors 203, 204 each have three circular poles. All three poles are needed, for example, by the heating element 205. While two of the poles are used for the heating element, the third pole is needed as a ground. By altering the power waveform of the connections 209, 210, 211, it is possible to send communication signals between the PCBs 201, 202. For example this can be done by varying the on-off duty cycle waveforms sent through the connections 209, 210, 211. Parameters or inputs or requests entered by the user using the user controls 206 can be interpreted and translated into operation or feedback commands for components such as the heating element 205, the motor 207 and the thermistor 208.

Figure 2B:
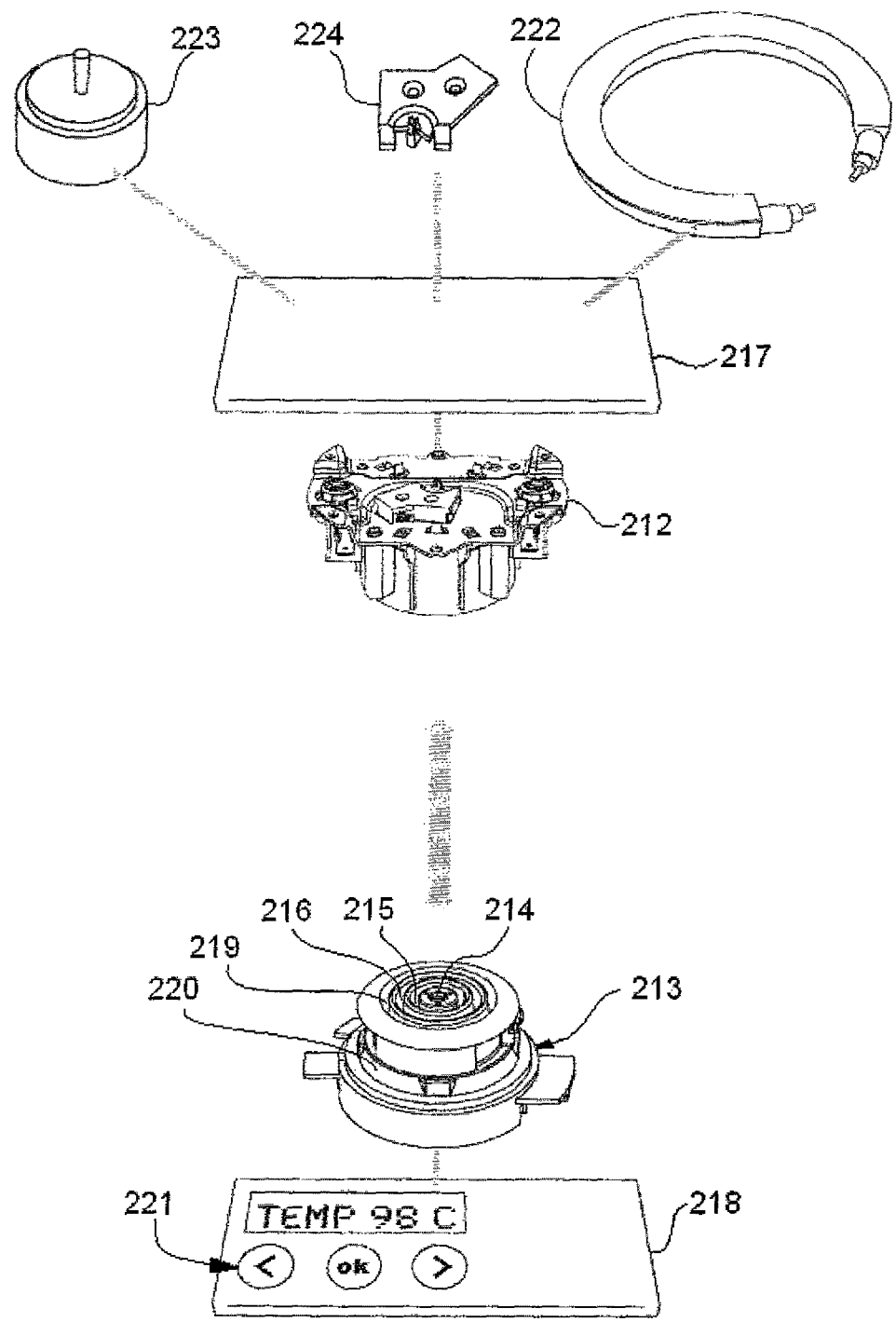

As shown in FIG. 2(b), the upper and lower connectors 212, 213 may each be a five pole connector. Instead of varying the duty cycle of the three connections 214, 215, 216 used for the various kettle components, the PCBs 217, 218 directly communicate with each other using the additional two poles 219, 220 as data links. The lower PCB 218 translates parameters such as the desired temperature limit of the fluid in the kettle from the user control 221 into operation commands for components such as the heating element 222 and the motor 223. The parameters are transmitted to the upper PCB 217 using the data contacts formed by the additional lower connector poles 219, 220, and their corresponding upper connector poles. The upper PCB 217 then sends the appropriate commands, power or signals to the various components. Similarly the upper PCB 217 encodes the thermistor 224 outputs as feedback commands, and communicates the feedback directly to the lower PCB 218 through the two data link poles 219, 220.

Although FIG. 2(b) depicts the two outermost contacts 219, 220 as being used as the data links, it should be appreciated that any two of the five contacts may be used for that purpose.

Figure 3:
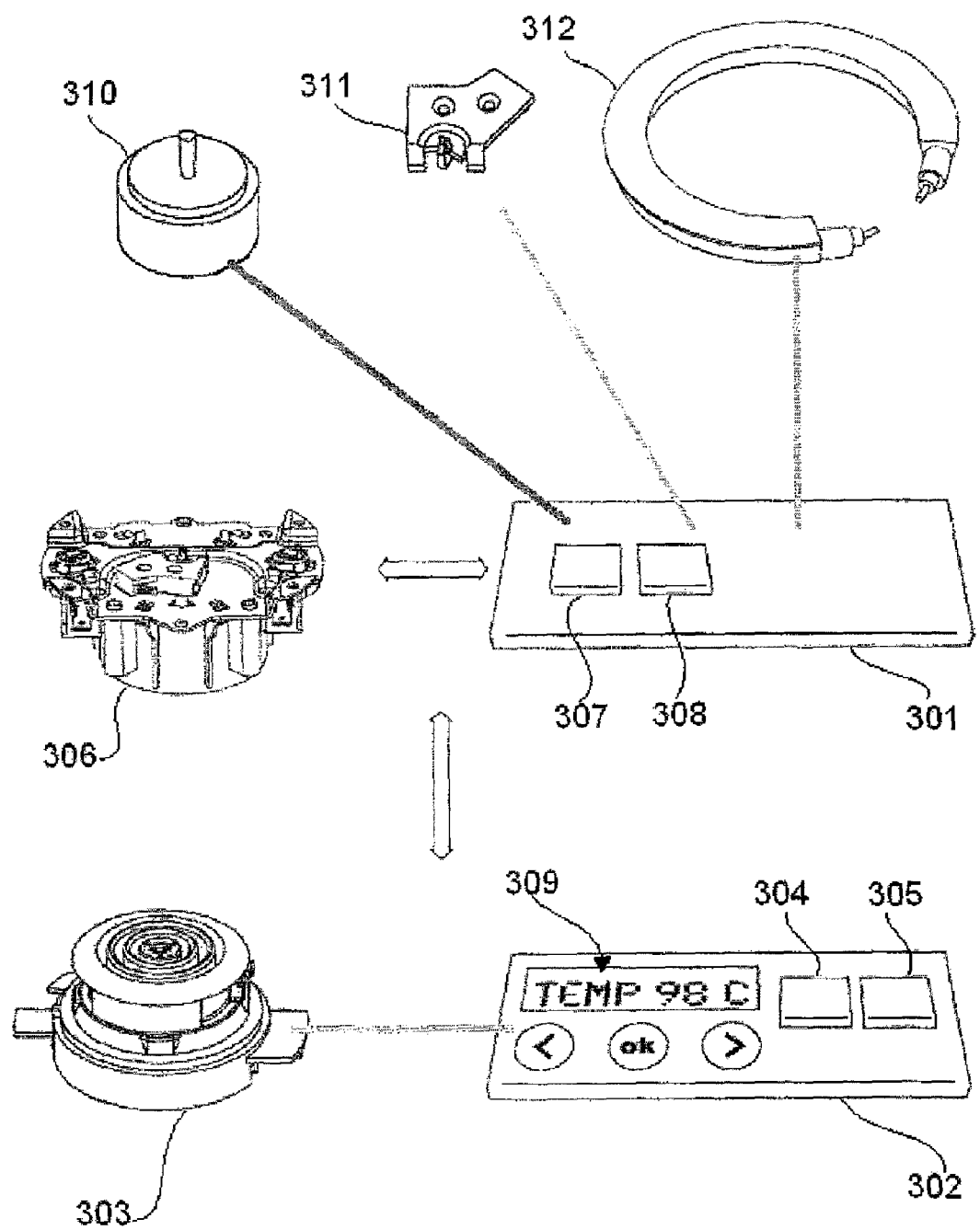
FIG. 3 is an exploded perspective view showing the components involved in a radio frequency communication.

In the embodiments described below, five pole connectors are illustrated, but three pole connectors can also be used. In the embodiment shown in FIG. 3, wireless data communication between the first and second PCBs 301, 302 are carried out via radio frequency (RF) transmitters and receivers. Power from the lower connector 303 energises an RF transmitter 304 and an RF receiver 305 mounted on the second PCB 302. The vessel's (i.e. upper) PCB 301 is powered through the upper connector 306, and is similarly outfitted with an RF transmitter 307 and an RF receiver 308, so that RF communication between the two PCBs is possible. The transmitters and receivers can be completely enclosed, thus sealed and kept out of sight. Control parameters are entered using the control and display panel 309. The parameters are encoded into RF signals and are transmitted by the lower RF transmitter 304. The upper PCB 301 receives this information through the upper RF receiver 308, and decodes it into commands for components such as the motor 310 and the heating element 312. The upper PCB 301 encodes outputs from the thermistor 311 into feedback signals, and can similarly transmit the feedback signals to the lower PCB 302 through RF communication.

Figure 4:
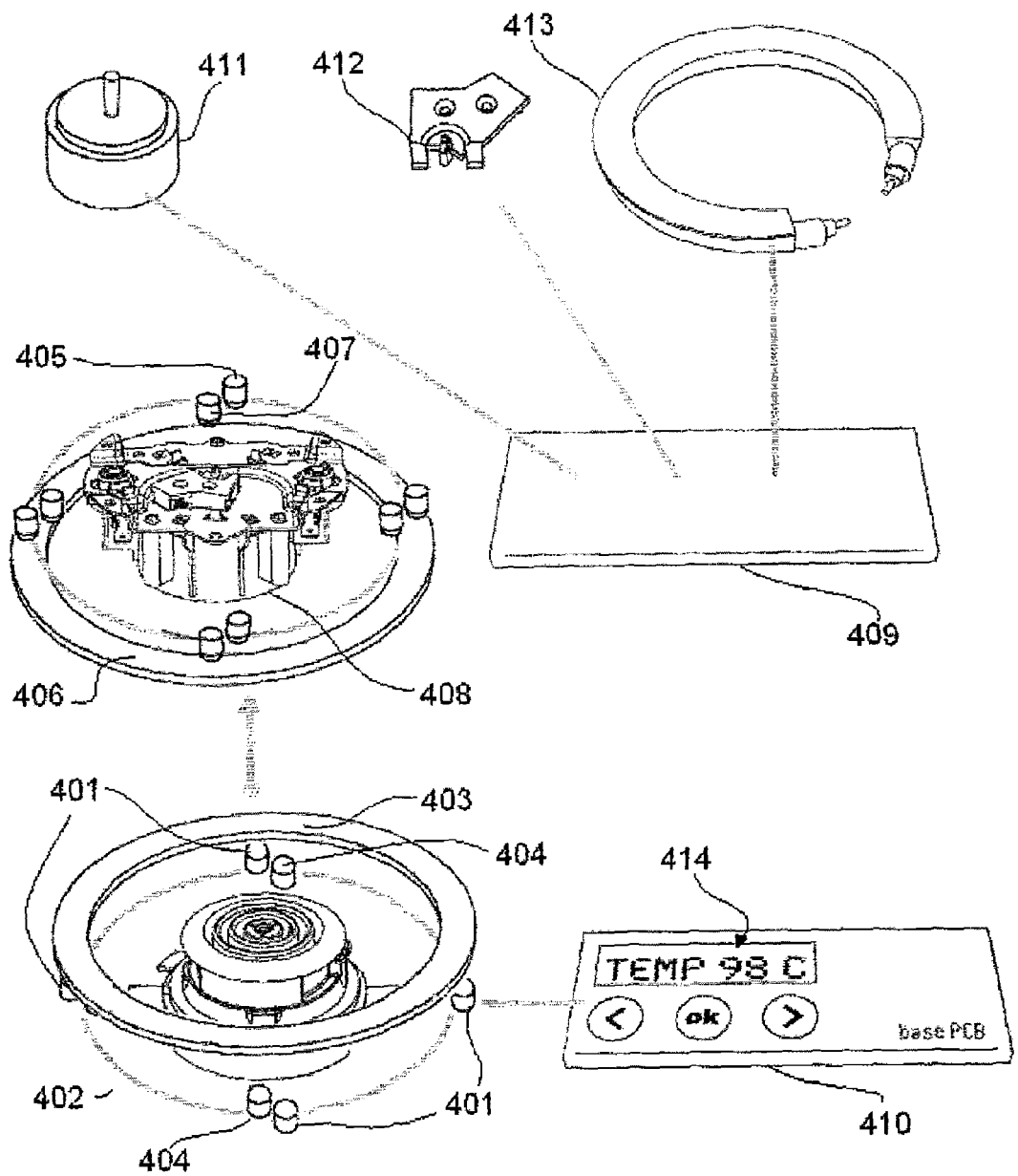
FIG. 4 is an exploded perspective view showing the components involved in an infrared communication.

In the embodiment shown in FIG. 4, wireless data communication may be enabled using optical transmitters and receivers that employ infrared or visible light. For example light emitting diodes (LED) may be used. Unlike radio waves, infrared and LED signals can only travel through optically transmissive materials. Further the transmitters need to direct the signals toward the receivers. For a 360° kettle, a ring of multiple transmitters 401 are located around the lower connector 402. The transmitted signals are diffused using an annular refractive lens 403. This arrangement optimizes the even distribution of the signal, and helps ensure that the signals are distributed and received, regardless of the vessel's orientation relative to the power base. In this embodiment, each transmitter is arranged in a pair with a receiver. The transmitter-receiver pairs are e.g. evenly arranged around the lower connector 402. For example four such pairs are distributed at 90° to each other around the connector. The same arrangement of a transmitter and receiver pair 405, 407, a refracting lens 406 is provided around the upper connector 408.

The control parameters that the user enters using the control panel 414 are encoded by the lower PCB 410 into infrared or LED signals. The PCB 410 sends the signals to be transmitted to the lower transmitters 401. The lower transmitter 401 sends the signal toward the upper receivers 407. The received signals are decoded by the upper PCB 409 into control commands for components comprising the motor 411 and the heating element 413. The upper PCB 409 encodes outputs from the thermistor 412 into feedback signals, and can similarly transmit the feedback signal to the lower PCB 410 through optical or infrared transmission.

Figure 5A:
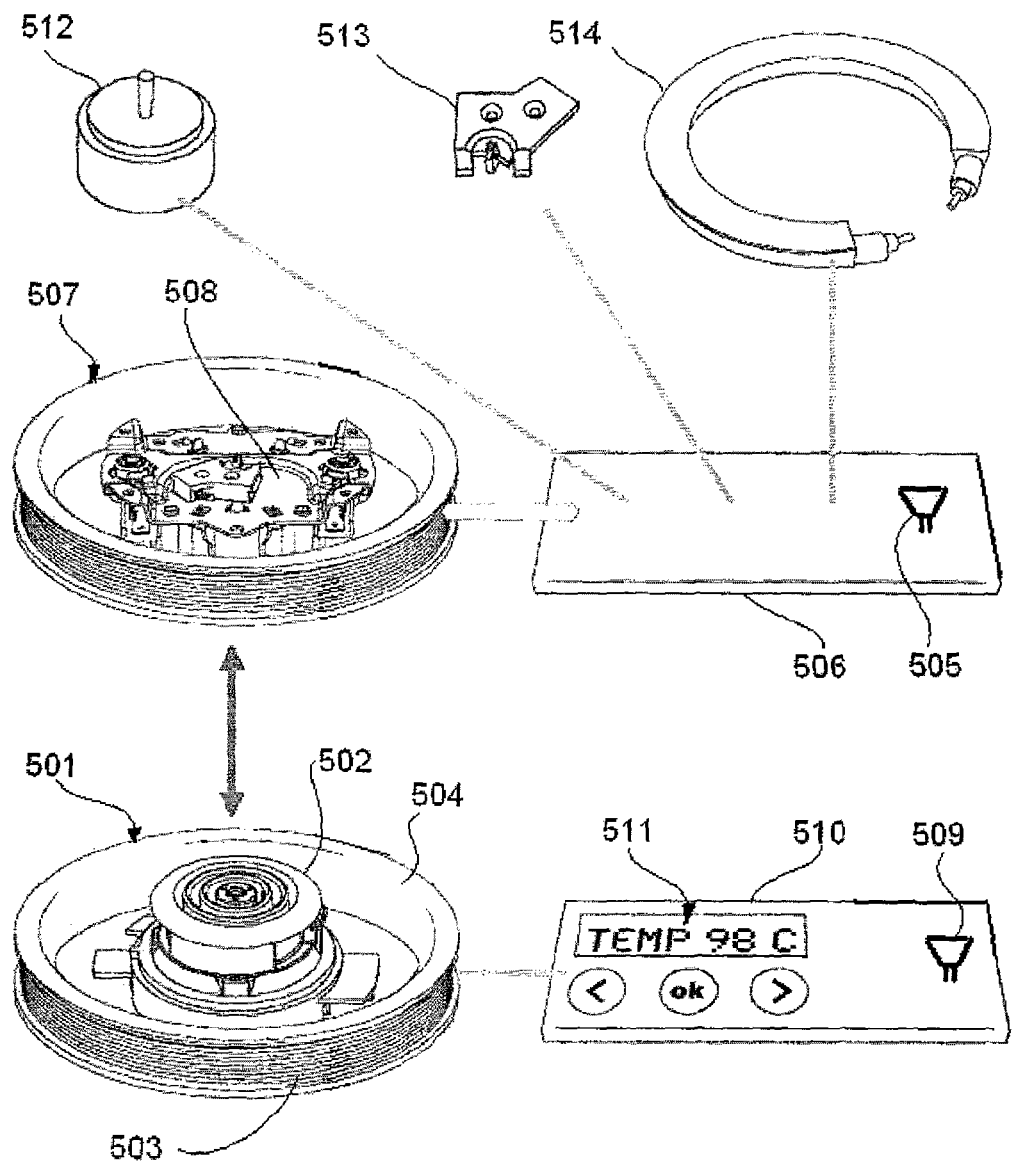
FIG. 5(*a*) is an exploded perspective view showing the components involved in an electro-magnetic communication.
Figure 5B:
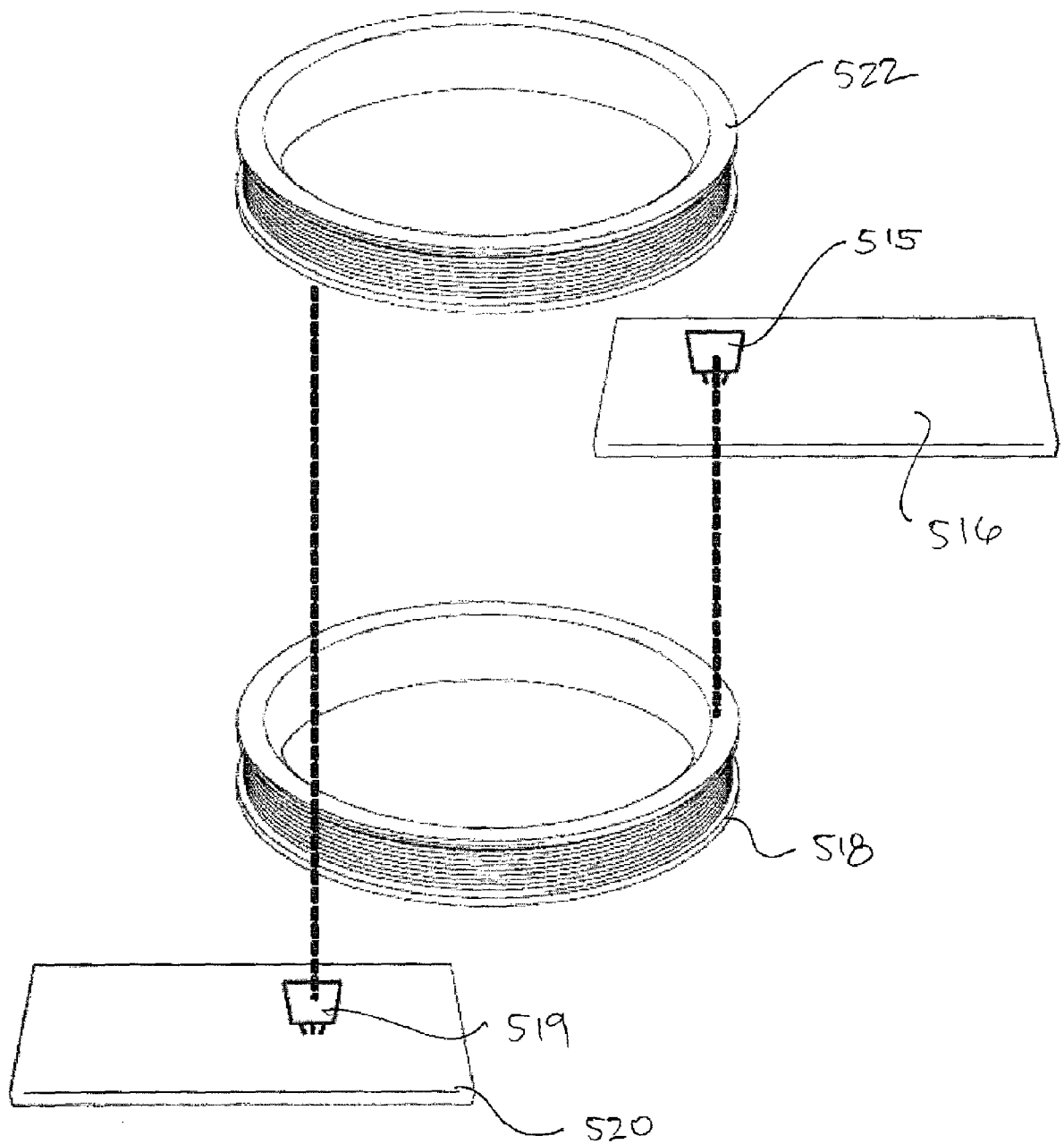

In the embodiment shown in FIG. 5 (a), data communication between the PCBs is carried out using electro-magnetic (EM) signals. EM transmitters and EM receivers, which need to be generally directed toward each other or aligned so as to function, can be provided in an assortment of shapes and sizes, subject to the transmitters and receivers fitting within the available layout. In the present example, an EM transmitter ring or antenna 501 is located e.g. around the lower connector 502 of a 360° kettle. The transmitter ring 501 is formed by winding wires 503 around a metallic ring or core 504, and passing a current through the windings 503 to create an EM field. An EM receiver 505 is situated on or at least in communication with the upper PCB 506 and is located within the EM field of the transmitter ring 501. Similarly, an EM transmitter ring or antenna 507 is provided around the upper connector 508, and another EM receiver 509 is situated within the transmitter's EM field, and is located on or in communication with the lower PCB 510. As such, it is possible to send data in the form of varying EM fields, by varying the current through the windings in the transmitter rings 501, 507. Control parameters entered from the control panel 511 are translated by the lower PCB 510 into EM signals. The EM signals are sent by the lower transmitter ring 501 toward the upper EM receiver 505. The upper PCB 506 decodes the received signal into control commands for components such as the electric motor 512 and the heating element 514. The upper PCB 506 may also encode outputs from the thermistor 513 into feedback signals, and similarly transmit the feedback signal to the lower PCB 510 through EM transmission.

As shown in FIG. 5 (b), in preferred embodiments, each receiver will be positioned e.g. within the projected circumference of its corresponding transmission ring, so as to maximize signal quality. Hence, the upper receiver 515, located on the upper PCB 516, is situated generally within the projected circumference of the lower EM transmitter 518. Likewise, the lower receiver 519 on the lower PCB 520 is situated within the circumference of the upper EM transmitter ring 522. While it is not essential that each receiver be positioned exactly within the circumference of its corresponding transmission ring, it is essential that the receiver be placed where EM field generated by the transmission ring is strong enough that it can be received.

Figure 6:
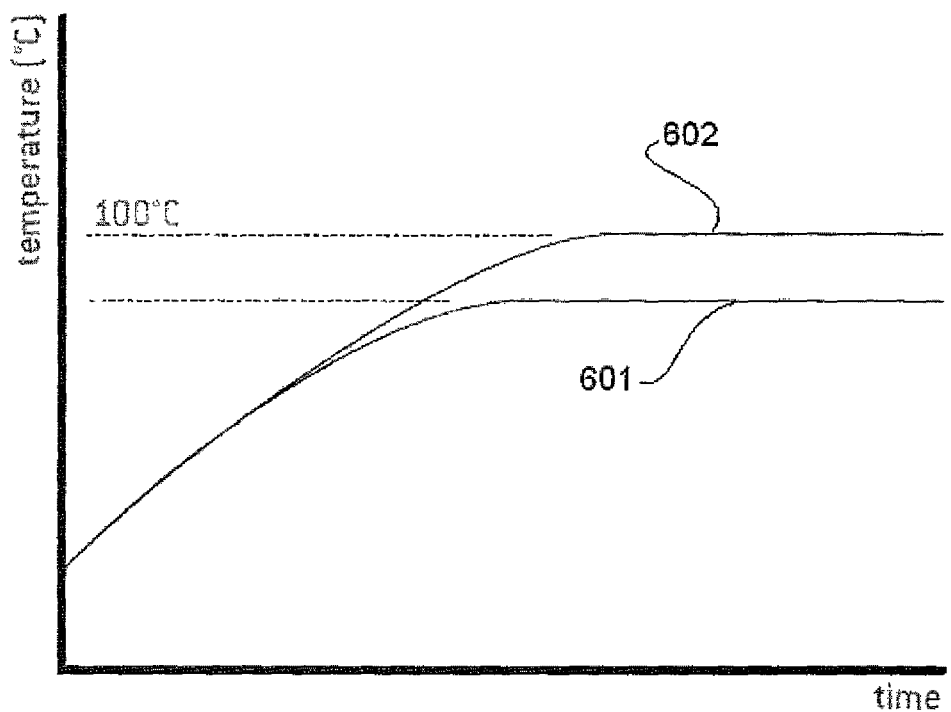
FIG. 6 is a graph showing the relationship between boiling temperature of water and altitude.

As shown in FIG. 6, the boiling temperature of water at a higher altitude 601 is lower than at sea level 602. Therefore, at a higher altitude, a kettle that is configured to sense or detect the sea level boiling temperature will continue boiling until the kettle is dry, because the sea level boiling temperature will never be reached. This creates safety concerns relating to fire hazards and heat related injuries. Hence it is desirable for some embodiments to include control mechanisms that accommodate kettle operation at various altitudes.

Water temperature does not continue rising after it reaches the boiling point. Therefore, it is possible to detect whether or not boiling point has been reached by monitoring a change in the water temperature. The boiling of water is detected when the water temperature ceases to change in a meaningful way.

Figure 7:
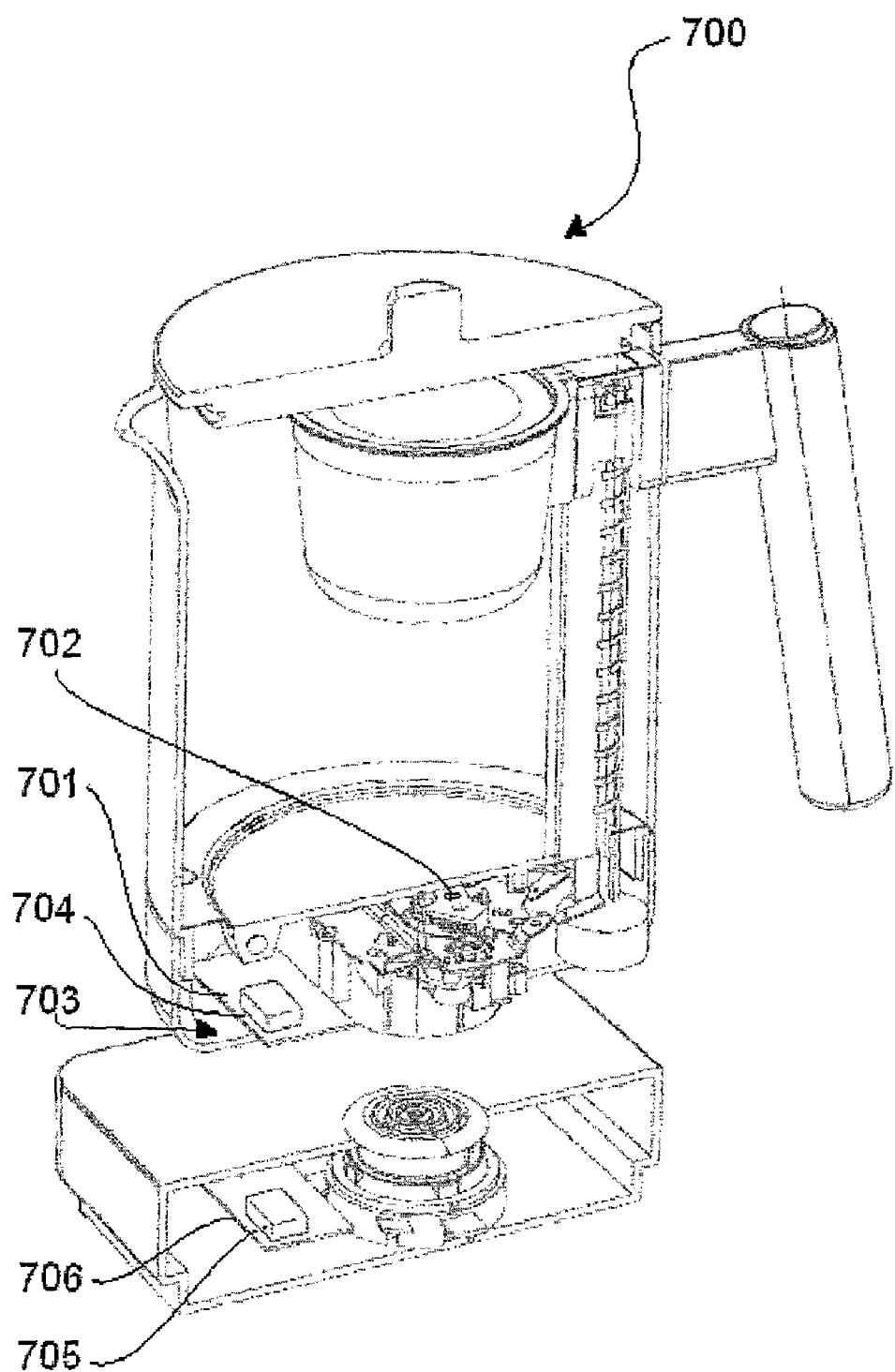
FIG. 7 is a perspective of an embodiment of the cordless electric kettle that is safely operable at various altitudes.

The embodiment shown in FIG. 7 is substantially the same as that shown in FIG. 1, except the embodiment in FIG. 7 can be operated at different altitudes. The upper PCB 701 receives inputs from a temperature sensor, such as a thermistor 702 located in the control compartment 703 of the kettle 700. The PCB 701 here has software 704 that determines whether the water has reached the boiling point, by assessing when the temperature ceases to change, over a pre-determined interval of time. It is envisioned that in other embodiments the controlling software 705 may be provided on the lower PCB 706. It is further possible that the upper and lower PCB software 704, 705 are both used for integrating user input with the sensor input. In embodiments of this type, the kettle can be used to safely boil water or other beverages irrespective of the altitude.

As shown in FIG. 8, the base connector 813 and the vessel connector 814 each have three power lines: neutral 821, 824, live 822, 825, and earth 823, 826. The earth lines 823, 826 provide ground connections. The neutral lines 821, 824 and the live lines 822, 825 transmit electricity to the heating element 815. A switch 827 is operable to open or close the live line 825 of the vessel connector 814. Apart from the three pole connection, there is no other electrical connection required between the vessel 811 and the base 812.

The power line transmission is usually done at a high voltage (usually 120 or 240V) and at a low frequency (usually 50 or 60 Hz). To be sent over the three-pole connection, the control signals are low voltage pulse width modulated digital data with a high frequency carrier. As will be discussed, the high frequency carrier allows the data to pass through signal filters and enter the power lines.

A transmitter in the base processes the control data for transmitting it toward the vessel. A receiver in the vessel isolates and processes the control data, and uses it to control the vessel's operation.

As shown in FIG. 9, the transmitter 930 comprises an amplifier 931 and a decoupling device 932. The MCU 917 sends the digital control signal to the amplifier 931. The amplifier 931 amplifies the signal strength and helps determine the strength of the signal to be injected into the power lines 922, 923. Preferably, the simplifier 931 operates on low power and can only transmit the signal over a short distance, such as 40 cm, along the alternating current (AC) power cable. Under this arrangement, there is a lower chance that the amplified signal may travel to another kettle that is plugged into the same mains circuit.

The amplified signal is passed through the decoupling device 932. The decoupling device 932 is a high pass filter which shows high impedance at low frequencies, such as 50 or 60 Hz, while showing low impedance at a high frequency, such as 125 KHz. The decoupled signal is then injected into the power lines 922, 923. The power lines 922, 923 transmit a composite signal that consists of the power signal and the control signal.

As shown in FIG. 10, the vessel power lines 1024, 1025 receive the composite signal from the base power lines 1022, 1023, and send it to a load 1041 such as the heating element, and also to a receiver 1040. The receiver 1040 sends data to the vessel MCU 1042.

The receiver 1040 comprises a decoupling device 1043. This decoupling device 1043 has the same or similar frequency characteristics as the decoupling device 1032 in the transmitter 1030. The control data becomes decoupled from the rest of the composite signal, after the composite signal passes through the decoupling device 1043. The decoupled signal is transmitted toward the vessel MCU 1042.

It is preferred that the receiver 1040 also comprises a high pass filter 1044 that further filters the decoupled signal before passing it toward the vessel MCU 1042. The high pass filter 1044 has a slightly narrower pass band than the decoupling device 1043, in that the lower cut-off frequency for the high pass filter 1044 is higher than that for the decoupling device 1043. For example, the pass band for the high pass filter 1044 starts at approximately 38 KHz.

It is also preferred that the receiver 1040 also have a tuned-amplifier 1045. The tuned-amplifier 1045 provides gain to the decoupled signal, but only at a pre-tuned frequency or in a pre-tuned frequency range. In particularly preferred embodiments, the decoupled signal passes through the high pass filter 1044 and then the tuned-amplifier 1045. The high pass filter 1044 and the tuned-amplifier 1045 serve to further isolate and strengthen the control data. In some embodiments, there may be an additional amplifier 1091 that further strengthens the output of the tuned-amplifier 1045 (see FIG. 15). In the current example, the tuned amplifier 1045 comprises a demodulator (or envelope detector) 1046 that demodulates the decoupled signal into low voltage digital pulses. In another embodiment, the demodulator 1046 may be separate from the tuned-amplifier 1045.

The vessel MCU 1042 decodes the demodulated signal into various control functions or events. The decoded data, produced by the vessel MCU 1042, is relayed to a control circuit 1047 that controls the load 1041. Preferably, the control circuit 47 further monitors the operation or status of the load circuit 1041, and sends a feedback data to the vessel MCU 1042.

In further preferred embodiments, the vessel and the base engage in bidirectional communication. The vessel 11 further incorporates a transmitter 930. The vessel MCU 1042 encodes a data, such as a feedback data, to be transmitted to the base by the transmitter 930. Correspondingly, the base further incorporates a receiver 1040. The base MCU decodes the data received by the receiver. The decoded data may be translated into information that can be displayed. For example, the information can be the current temperature or the current kettle operation status. The information may be viewable from a display area such as a liquid crystal display.

Circuitry and Data Examples

FIG. 11(*a*) depicts a low voltage digital data that is modulated by a high frequency carrier. FIG. 11(*b*) depicts the demodulated low voltage digital data. The logic value "1" is characterised by a long pulse width 1151, whereas the logic value "0" is characterised by a short pulse width 1152. As shown in FIG. 11 (*c*), each of the logic "1" pulse 1153, logic "0" pulse 1154, start bit 1155, and end bit 1156 comprise a high step 1157 followed by a low step 1158. The duration of the high and low steps 1157, 1158 are presented in the following table.

| Pulse type | High Step duration | Low step duration |
|---|---|---|
| Logic "0" | 0.75 ms | 0.5 ms |
| Logic "1" | 1.5 ms | 0.5 ms |
| Start bit | 2 ms | 0.5 ms |
| End bit | 2.5 ms | 0.5 ms |

FIG. 11(*d*) depicts an example of a transmitted signal 1159, and illustrates the data transmission protocol. A start-bit 1155 marks the beginning of the signal 1159. The start bit 1155 is followed by a four bit identification code 1160. The data bits 1161 follow the identification code 1160. For error detection, a four bit check sum 1162 follows the data bits 1161. Finally, an end-bit 56 marks the end of the signal 1159.

As shown in FIG. 12, the decoupling device (932, 1043) can be realized by a parallel resistor-capacitor circuit.

As shown in FIG. 13, the amplifier 931 can be designed using a single transistor. In this example, a junction transistor 1370 is used. The decoupled signal is sent into the base 1371, and the amplified signal is available from the collector 1372.

As shown in FIG. 14, the high pass filter 1044 in the receiver 1040 is a resistor-capacitor high pass circuit.

FIG. 15 depicts a circuit that realizes the preferred embodiment of the receiver 1040.

Figure 16:
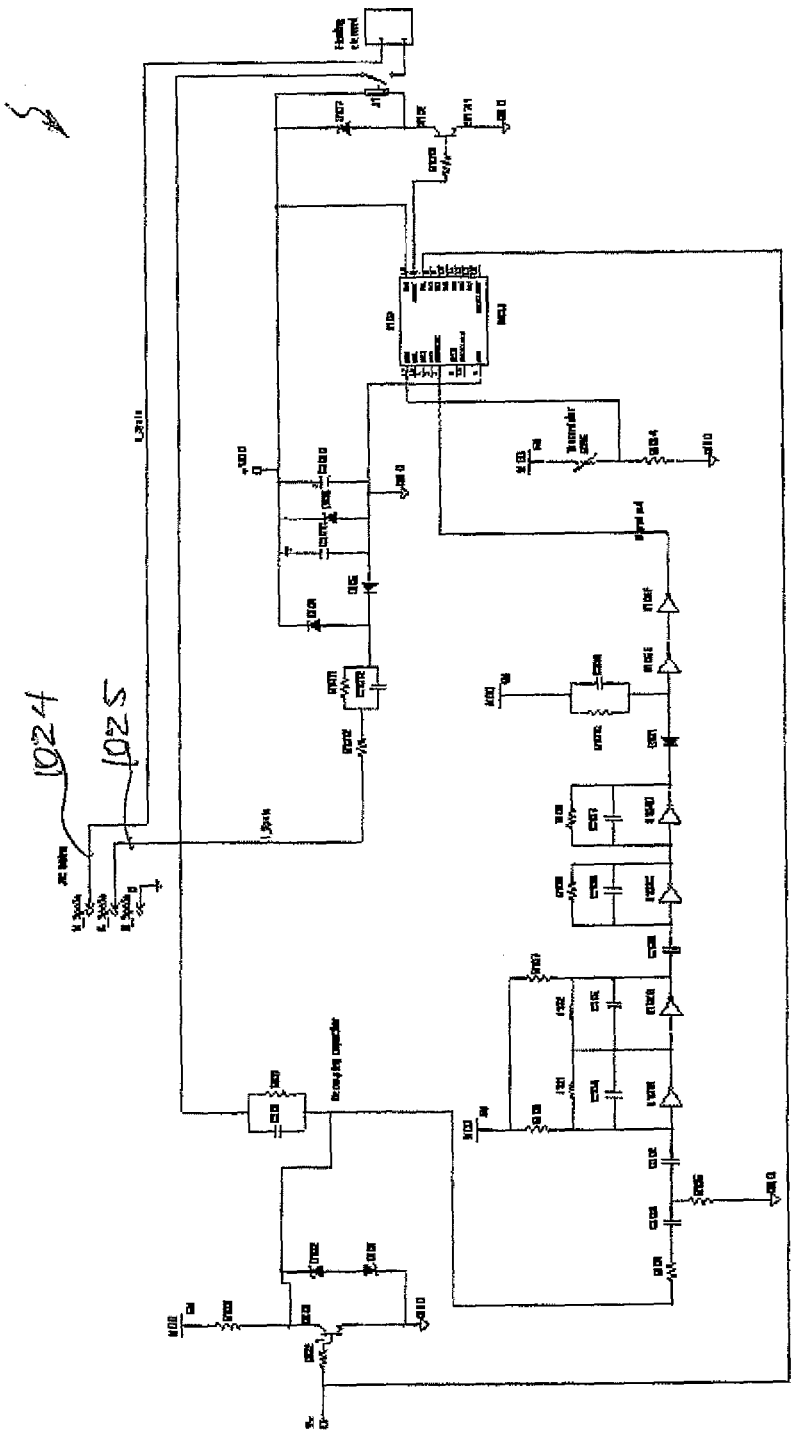
FIG. 16 is a circuit diagram for a vessel.

FIG. 16 depicts a circuit schematic for a vessel 1601 that has a receiver 1040 that receives data from the power lines 1024, 1025 and decodes it. The vessel also has a transmitter 30 that encodes data and transmits it to the base via the power lines 824, 825.

Figure 17:
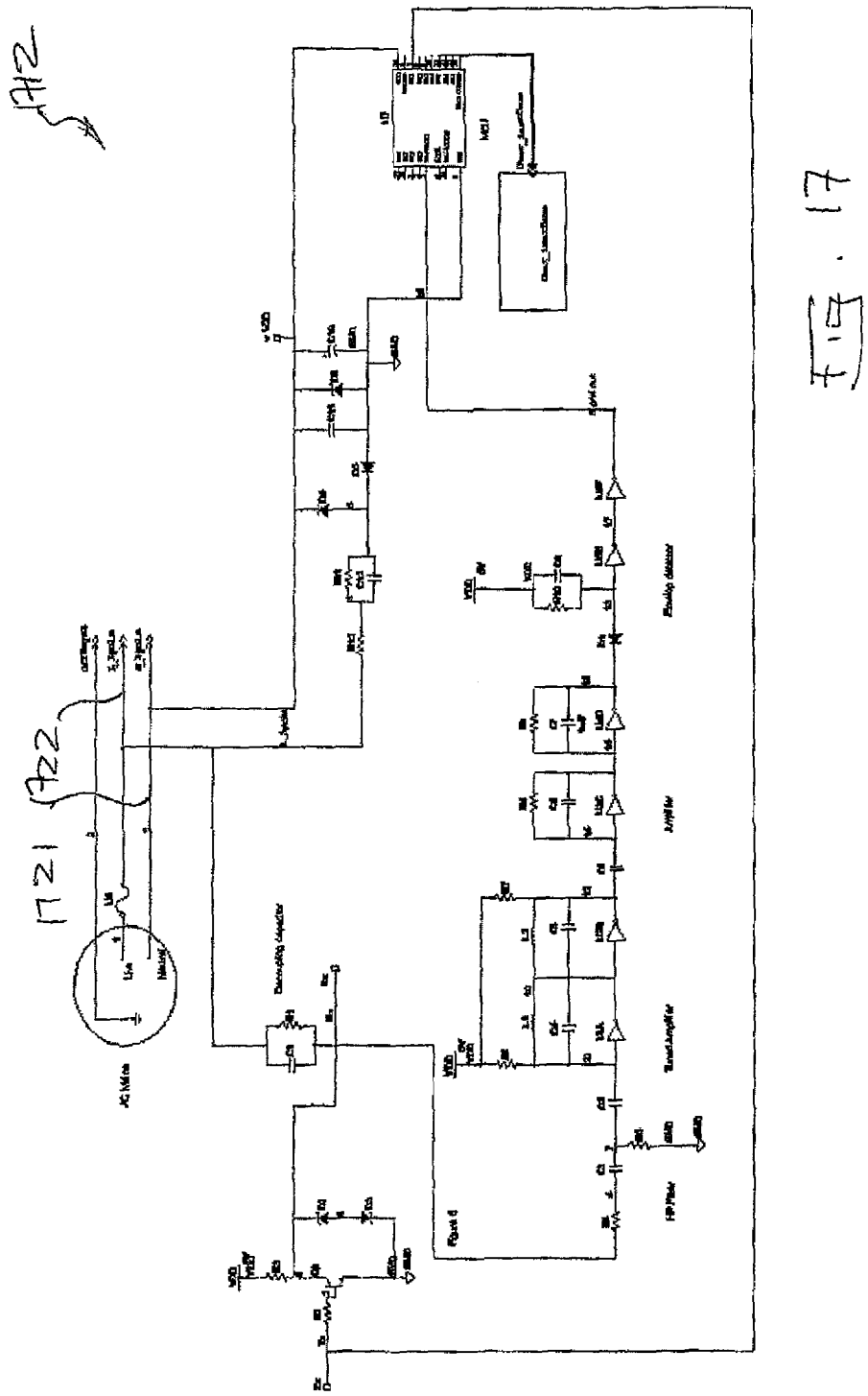
FIG. 17 is a circuit diagram for a base.

FIG. 17 depicts a circuit schematic for a base 1712. The base 1712 has a receiver 1040 that receives data from the power lines 1721, 1722 and decodes it. The base also has a transmitter that encodes data and injects it into the vessel, via the power lines 1721, 1722.

Software Control Process

Figure 18:
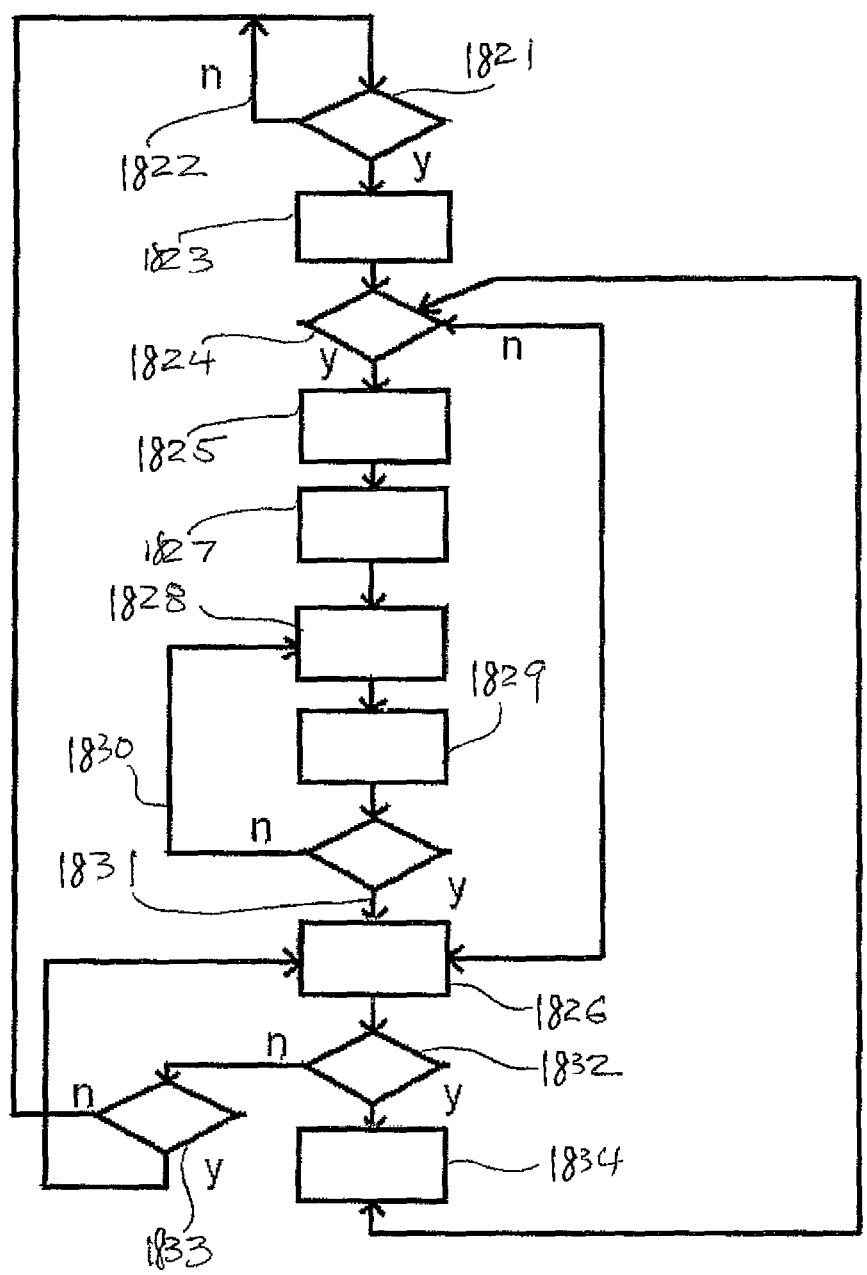
FIG. 18 is a flow chart depicting software control in the base.

FIG. 18 depicts an example of software controls or checks that occur in the base. The MCU first checks whether the vessel is properly placed 1821. The software keeps on checking for proper placement 1822 until it detects that the vessel is property placed. If the vessel is properly placed, the MCU software in the base optionally generates a random identification code and sends the code to the vessel 1823. The random identification code allows the vessel and the base of the same kettle to recognize each other. The vessel ignores data from an unidentified base, and the base ignores data from an unidentified vessel.

The base MCU then checks whether a user has entered anything using the user interface keys 1824. The MCU converts the user's selection into encoded digital data 1825 if a selection has been made. Otherwise, the MCU transmits requests the vessel's status 1826. The user's selection can be, for example, a desired temperature or a type of beverage brewed.

The encoded digital data is modulated with a high frequency carrier 1827 and then sent through the power lines 1828. The MCU attempts to detect a data acknowledgement from the vessel 1829. This detection attempt may be continued for about 50 ms. Failure to detect the acknowledgement 1830 triggers the MCU to send the encoded data through the power lines 1828 again. A detection of this acknowledgement 131 triggers the MCU to request the vessel's status 1826. The current status can be, for example, the current beverage temperature in the vessel, or the type of beverage currently being brewed in the vessel.

The MCU waits to receive the vessel's status 1832. Failure to receive the status 1833 triggers the MCU to check whether the vessel is properly placed on the base. If the vessel is properly placed, the MCU transmits the status request 1826 again. Otherwise, the MCU continues checking for proper placement 1821.

After the base MCU receives the vessel's status, the vessel's status is shown on a display area viewable by a user 1834. The base MCU continues to check for new selections or entries made by the user 1823 after the status is shown 1834.

Figure 19:
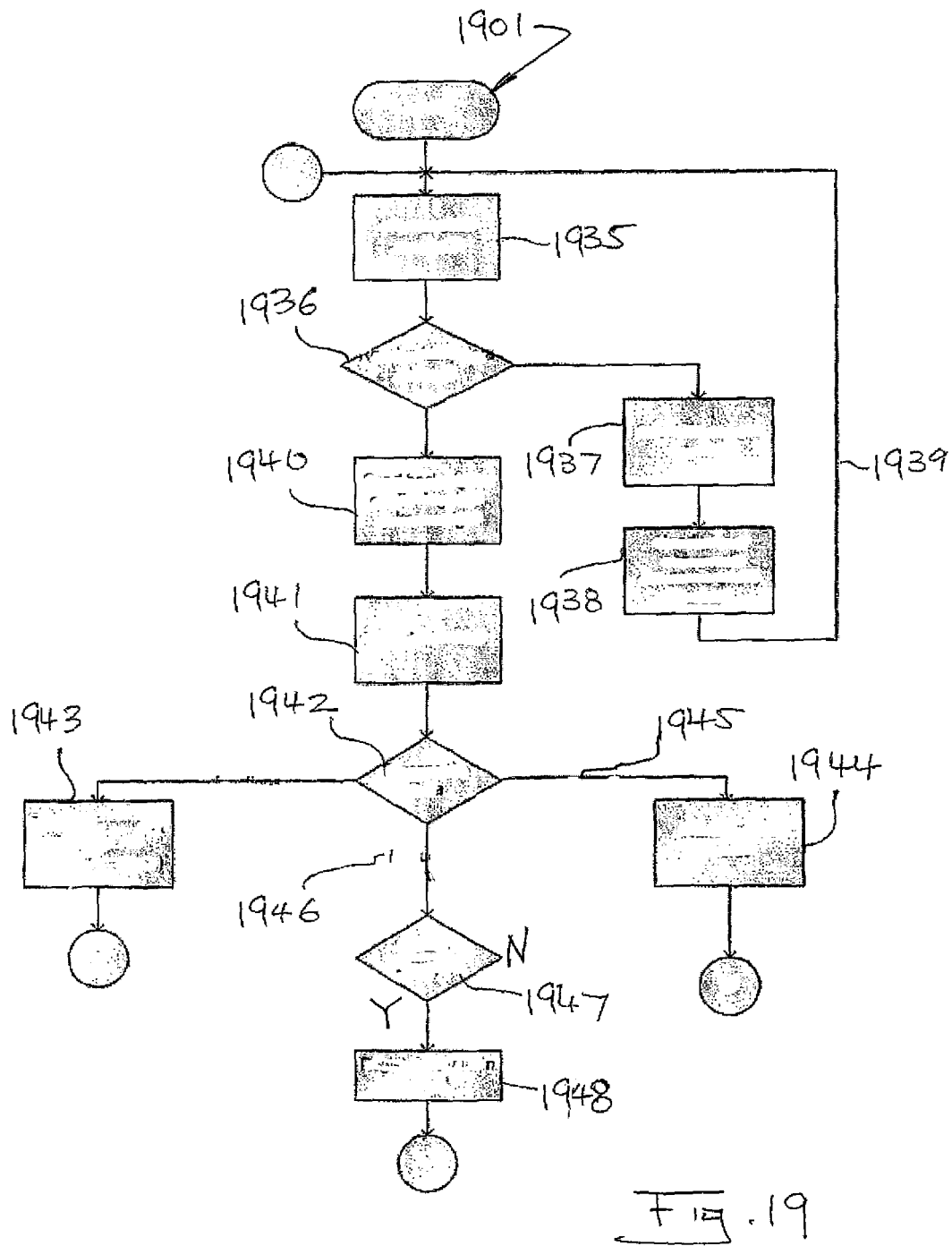
FIG. 19 is a flow chart depicting software control in the vessel.

FIG. 19 depicts an example of software controls or checks that occur in the vessel. After initiation 1901, the vessel's MCU waits for data from the base 1935. After the vessel's MCU receives the data 1936, it checks the status of the vessel 1937. If needed, the MCU handles any abnormal conditions that the vessel experiences 1938. The vessel status is then sent back to the base 1939.

After the vessel's MCU receives data from the base 1936, it also sends to the base an acknowledgement or a confirmation of data receipt 1940. Afterwards, the MCU decodes the data 1941. The decoded data is processed by the MCU 1942. Based on the processed data, the MCU may command certain functions to be performed 1943. For example, the MCU may command a measurement of the current beverage temperature.

After the data processing 1942, the MCU can also transmit the vessel status 1944 upon receiving a status request from the base 1945. In the case that the processed data contains a request for the vessel MCU to register the base identification code (i.e. processed data includes an identification code) 1946, the MCU checks if there is currently any registered identification 1947. The MCU registers the base identification code 1948 if none has been registered.

Figure 20:
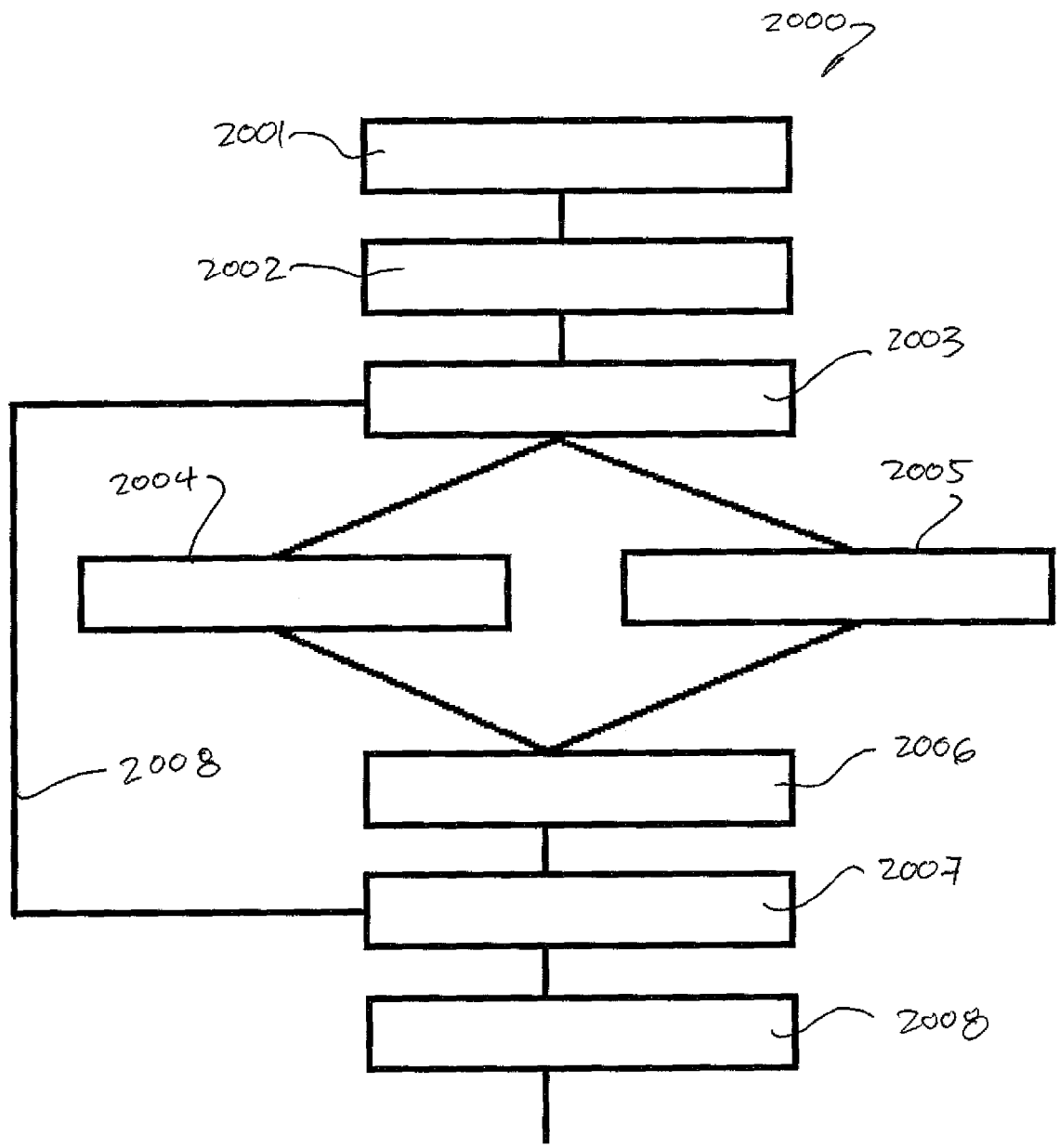
FIG. 20 is a flow chart illustrating a method for avoiding a dry boil event in a kettle.

FIG. 20 illustrates a flow chart of an alternate method 2000 for determining when to turn off the heating elements in a boiling device to avoid dry boil situations. As shown in the flow chart, before switching on the elements, a time counter is set to zero 2001 and the software has a stored predefined initial value for a target temperature 2002. Theoretically this value could be any temperature below the boil point. In this example we can use 0 as the initial target temperature. At the start up, the processor or MCU commands the switching-on of the heating element and starts to read the real time temperature of the liquid in the reservoir. Once the MCU reads the real time temperature of the liquid, it immediately compares the real time temperature with the target temperature 2003. This real time measured temperature does not require storage in the memory as it only used for comparison with the target temperature. If the comparison reveals that the measured real time temperature is greater than the target temperature, the target temperature is incremented up by e.g. 1 degree and the time counter is re-set to zero 2004. If the measured real time temperature is not greater than the target temperature, then the time counter is incremented by e.g. 1 second 2005. In either event, a delay interval, e.g. 1 second is imposed between temperature comparisons 2006. Thus, the comparison will be done in certain time intervals (e.g. 1 sec) and if the measured temperature is higher than the target temperature, the time counter will reset to zero and increase the target temperature for the next comparison. If the time counter reaches a predefined value (e.g. 5 seconds) 2007 and the measured temperature cannot reach the new target temperature with that time frame, the MCU interprets this event as the boiling point having been reached and sends a command to switch-off the heating elements 2008. If the measured temperature can reach the new target temperature with that time frame, the comparison 2003 is repeated 2009.

While the present invention has been disclosed with reference to particular details of construction, these should be understood as having been provided by way of example and not as limitations to the scope or spirit of the invention.

What is claimed is:

1. A cordless kettle assembly comprising a kettle that is supported by a base and removable from the base, electrical power for the operation of the kettle being supplied to the appliance from the base, and data being bi-directionally exchanged between the kettle and the base, further comprising:

a first processor in the base that transmits first data signals to a second processor located in the kettle;

the second processor adapted to use the first data signals to generate a first control command for operating a first component located in the kettle;

the second processor receiving first feedback data signals from within the appliance relating to the control of the first component.

2. The assembly of claim 1, wherein:

the second processor is adapted to transmit second feedback data signals to the first processor in response to the first data signals.

3. The assembly of claim 2, wherein:

the first processor is adapted to use the first feedback data signals to generate and transmit a third feedback data signal to the second processor.

4. The assembly of claim 1, wherein:

the component located in the kettle is a motorised component.

5. The assembly of claim 1, wherein:

electrical power is transmitted between the kettle and the base using a three pole power coupling on the kettle and a three pole power coupling on the base;

the bi-directional exchange of data being wireless.

6. The assembly of claim 4, wherein the component is a conveyor.

7. The assembly of claim 1, wherein:

the second processor is adapted to use the first data signals to generate a second control command for operating a second component located in the kettle.

8. The assembly of claim 7, wherein:

the second component is a heating element.

9. The assembly of claim 8, wherein:

the kettle comprises a tea maker in which tea is carried by the conveyor.

* * * * *